United States Patent [19]
Romstad et al.

[11] Patent Number: 5,562,429
[45] Date of Patent: Oct. 8, 1996

[54] PULSE DAMPENER AND FUEL PUMP HAVING SAME

[75] Inventors: Bruce A. Romstad, Deford; Frederick J. Whitcroft, Bloomfield Hills, both of Mich.

[73] Assignee: Caro Manufacturing Corporation, Caro, Mich.

[21] Appl. No.: 126,910

[22] Filed: Sep. 24, 1993

Related U.S. Application Data

[60] Continuation-in-part of Ser. No. 797,407, Nov. 25, 1991, abandoned, which is a division of Ser. No. 413,945, Sep. 28, 1989, abandoned.

[51] Int. Cl.$^6$ ............................................. F04B 11/00
[52] U.S. Cl. .................................................... 417/540
[58] Field of Search ................................ 417/540, 366, 417/312, 543; 264/501, 524

[56] References Cited

U.S. PATENT DOCUMENTS

| | | | |
|---|---|---|---|
| Re. 23,564 | 10/1952 | Hobson | 18/5 |
| 2,473,726 | 6/1949 | Payne | 417/90 |
| 2,766,840 | 10/1956 | Monroe | 181/50 |
| 3,273,577 | 9/1966 | Moore | 137/13 |
| 3,295,159 | 1/1967 | Fischer | 18/5 |
| 3,983,199 | 9/1976 | Uhlig | 264/89 |
| 4,181,473 | 1/1980 | Ina | 417/540 |
| 4,199,129 | 4/1980 | Fisher | 249/58 |
| 4,401,416 | 8/1983 | Tuckey | 417/283 |
| 4,507,063 | 3/1985 | Kemmner et al. | 417/540 |
| 4,521,164 | 6/1985 | Tuckey | 417/307 |
| 4,585,400 | 4/1986 | Miller | 417/540 |
| 4,588,360 | 5/1986 | Tuckey | 417/366 |
| 4,645,447 | 2/1987 | Sumitomo | 425/450 |
| 5,035,588 | 7/1991 | Tuckey | 417/540 |
| 5,122,039 | 6/1992 | Tuckey | 417/366 |
| 5,253,995 | 10/1993 | Rumstad et al. | 425/522 |
| 5,374,169 | 12/1994 | Talaski | 417/540 |
| 5,413,468 | 5/1995 | Tuckey | 417/540 |

FOREIGN PATENT DOCUMENTS

| | | |
|---|---|---|
| 1338443 | 9/1963 | France . |
| 1085662 | 7/1954 | Germany . |
| 57-83436 | 5/1982 | Japan . |
| 5890927 | 5/1983 | Japan . |
| 1119176 | 10/1965 | United Kingdom . |

OTHER PUBLICATIONS

Modern Plastics Encyclopedia 1989, p. 19, Roger Jones "Acetal".

Modern Plastics Encyclopedia 1989, p. 217, Christopher Irwin. "Extrusion–Blow Molding".

*Primary Examiner*—Timothy S. Thorpe
*Assistant Examiner*—Peter G. Korytnyk
*Attorney, Agent, or Firm*—Reising, Ethington, Barnard & Perry

[57] ABSTRACT

A pulse dampener for fuel systems having a rotary fuel pump and a fuel flow passage. The pulse dampener includes a hollow torus-shaped body with a fluid disposed within the body and the hollow body defining two flat surfaces disposed in spaced parallel relation with respect to one another and perpendicular to the flow of fuel through the fuel system. The pulse dampener further includes a pair of sides disposed perpendicular to and interconnecting the spaced flat surfaces to define the torus shaped pulse dampener to dampen pressure pulses within the fuel.

4 Claims, 4 Drawing Sheets

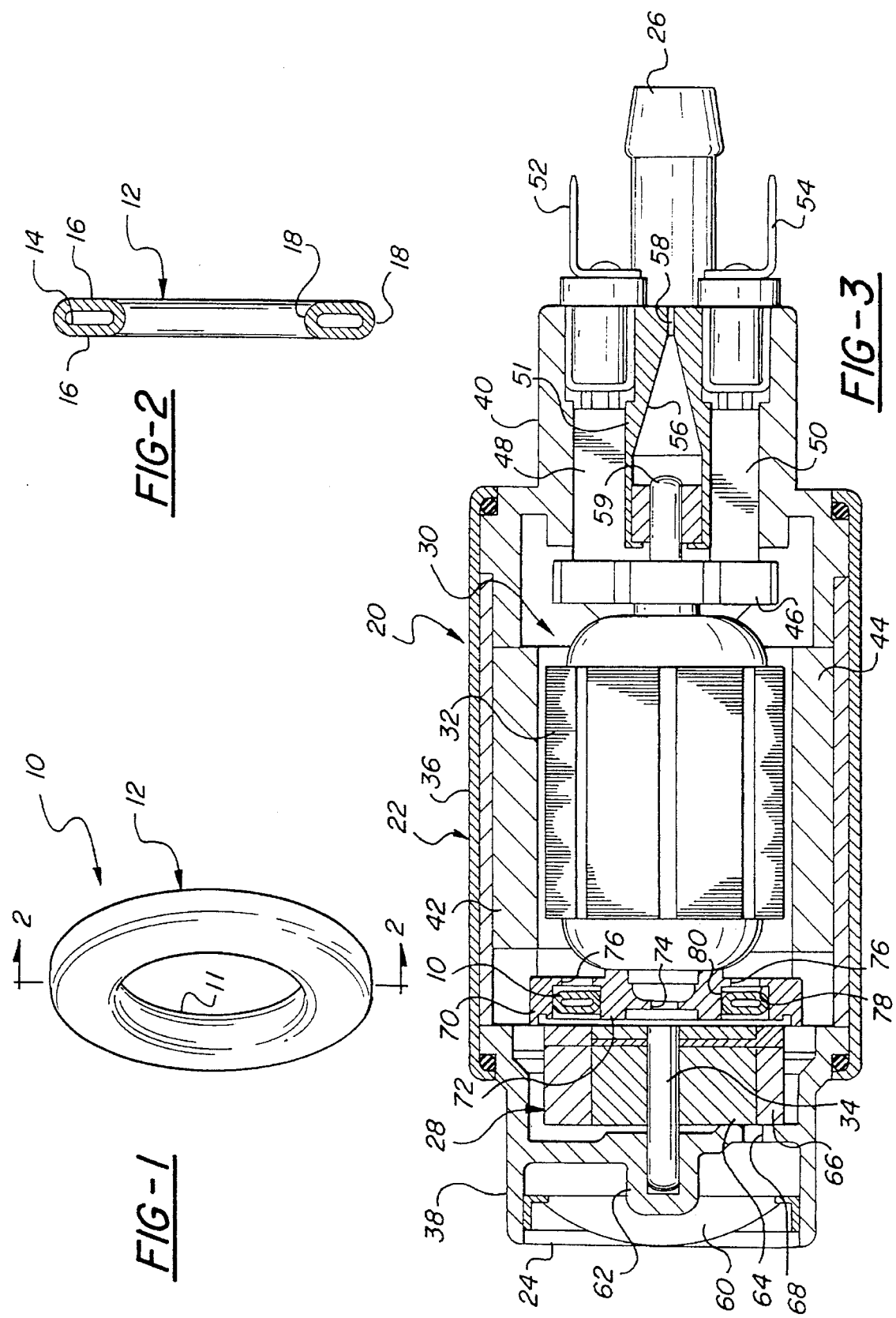

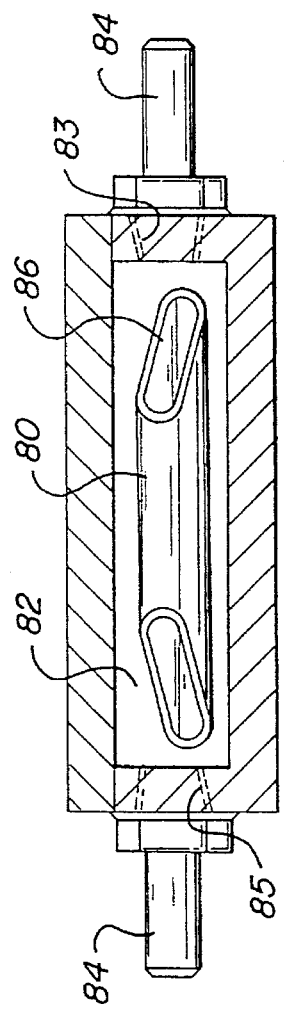
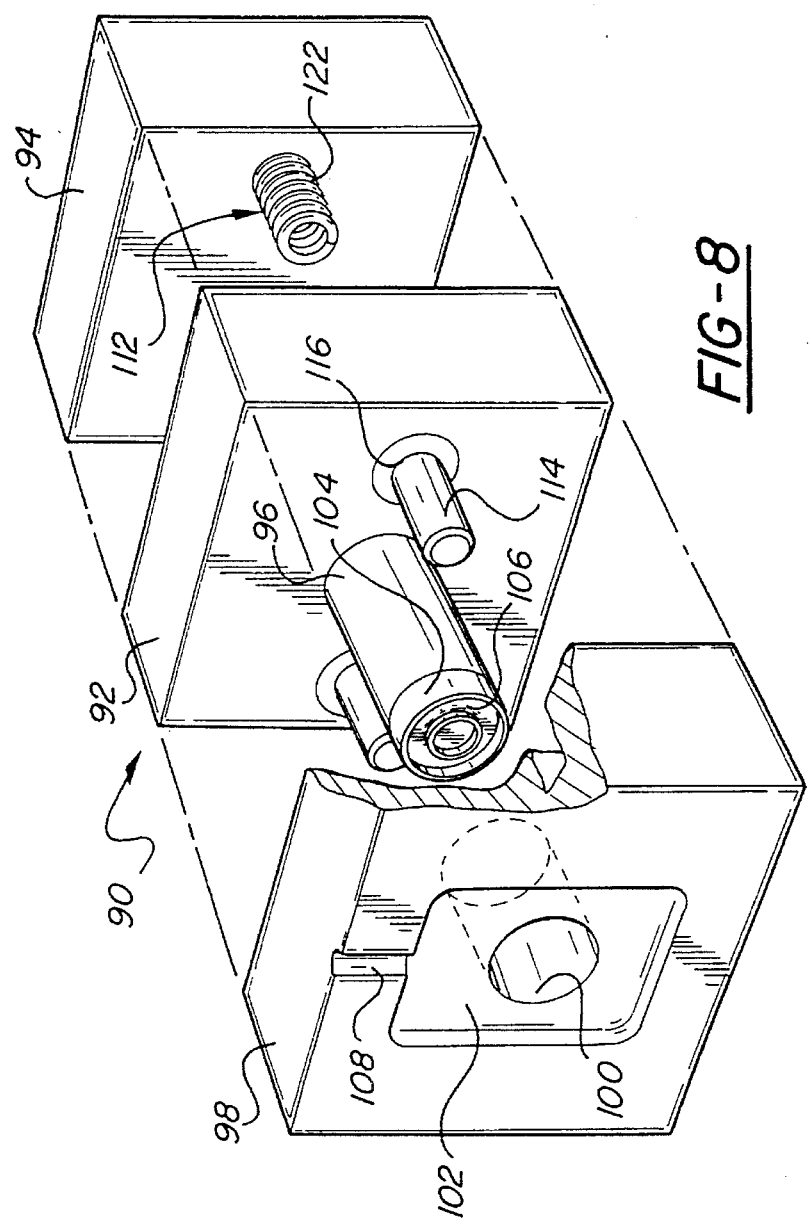

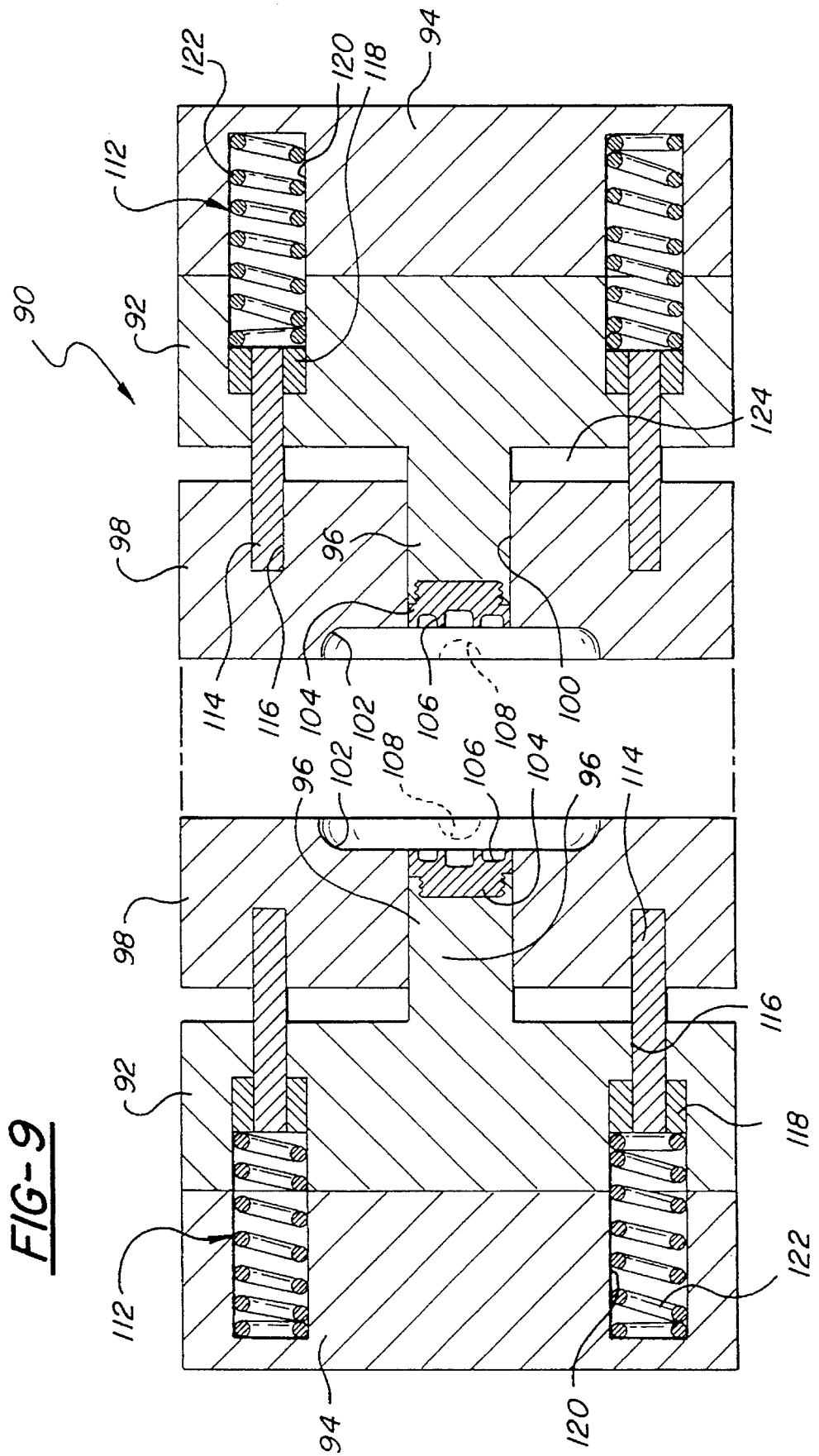

5,562,429

PULSE DAMPENER AND FUEL PUMP HAVING SAME

CROSS-REFERENCE TO RELATED APPLICATIONS

This application is a continuation-in-part of U.S. application Ser. No. 797,407 filed Nov. 25, 1991, now abandoned, which is a divisional application of our abandoned U.S. application Ser. No. 07/413,945 filed Sep. 28, 1989, now abandoned, and entitled Pulse Dampener, Method and Apparatus For Making Same, the entire disclosure of which is incorporated herein by reference.

BACKGROUND OF THE INVENTION (1) Technical Field

The invention relates to a rotary fuel pump for pumping fuel along a fuel line in which a hollow pulse dampener is disposed in the path of fuel flowing through the system for dampening pressure pulses in a fuel system.

(2) Description of the Prior Art

One of the major concerns in the design, engineering and manufacture of the automobile is maintaining a quiet ride. In meeting these concerns, the automotive industry has endeavored to reduce, dampen or eliminate, as much as possible, the noise sources in the vehicle. One source of noise in the vehicle is derived from pressure pulses in a pressurized fuel line. Positive displacement fuel pumps as well as the on and off action of fuel injectors can cause undesirable "pulses" which create unwanted noise in the system.

Pulse dampeners are known in the prior art. Typically, in automotive applications, a diaphragm-type accumulator is disposed along the fuel line between the fuel pump and the injectors. The pressurized fuel flows through an axial passage in the pulse dampener which includes an aperture which exposes a flexible diaphragm to the pressurized fuel. When a pressure pulse exceeds a predetermined level, the diaphragm flexes, thereby dampening the pressure pulses and smoothing out this operating parameter. This type of pulse dampener is relatively complex and expensive as compared to the subject invention.

Pulse dampeners have also been employed to dampen the pressure pulses in water pumps and to reduce "water hammer" in plumbing. For example, an air filed rubber annulus which is yieldable to the pressure pulses generated by a water pump disposed in a well is disclosed in U.S. Pat. No. 2,473,726 issued to Payne on Jun. 21, 1949. Similar attempts have been made to reduce noise and dampen pulses in fuel systems by employing flexible members, typically made of a rubber based material, disposed in-line in the fuel system for absorbing and dampening the pulses. The desirable characteristics of these types of pulse dampeners in the prior art typically degrade with time when the material is exposed to gasoline or methanol.

Heretofore, there has been no cost effective efficient way to dampen pressure pulses in a fuel system using a pulse dampener disposed in-line of the system and which is constantly exposed to or immersed in the fuel.

The pulse dampener of the subject invention is manufactured using an apparatus and method which utilizes blow-mold technology. Methods and apparatus for making products using blow-mold technologies are known in the prior art. However, heretofore, it has not been possible to manufacture a pulse dampener of the subject invention utilizing blow-mold technology as described below. The subject invention addresses these deficiencies in the prior art in a very efficient, durable, and effective fuel pump system having a pulse dampener disposed along the path of fuel flowing through the system.

SUMMARY OF THE INVENTION AND ADVANTAGES

The subject invention is directed toward a fuel pump system having a pulse dampener for dampening pressure pulses in the fuel pumping system. The pump includes a pump housing having a fuel inlet and a fuel outlet, a pump means and an electric motor rotatably supported within the housing between the inlet and outlet. The motor includes a shaft for driving the pump means thereby pumping fuel along the fuel line. The fuel pump also includes a pulse dampener disposed about the shaft and between the pump means and the electric motor and along the path of fuel flowing through the housing. The pulse dampener includes a hollow torus-shaped body with a fluid disposed within the body. The hollow body defines two flat surfaces disposed in spaced parallel relation with respect to one another and perpendicular to the flow of fuel through the pump. The hollow body further defines a pair of sides disposed perpendicular to and interconnecting the spaced flat surfaces to define the torus-shaped pulse dampener to dampen pressure pulses within the fuel.

Accordingly, the subject invention overcomes the problems of the prior art in a fuel pump system including a pulse dampener for dampening pressure pulses in the fuel systems which is very effective, is much less expensive than present assemblies employed in the prior art and which is resistant to fuels and solvents thereby adding to the pulse dampeners operating life.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of the pulse dampener of the subject invention;

FIG. 2 is a sectional view taken substantially along lines 2—2 of FIG. 1;

FIG. 3 is a cross-sectional side view of a rotary fuel pump of the subject invention illustrating the pulse dampener disposed within the pump;

FIG. 7 is a cross-sectional side view of a pulse dampener disposed within a chamber located along the path of fluid flow in the fuel system;

FIG. 8 is an exploded perspective view of one half of the molding apparatus for making the pulse dampener of the subject invention; and FIG. 9 is a cross-sectional top view of the molding apparatus employed to make the pulse dampener of the subject invention.

DESCRIPTION OF THE PREFERRED EMBODIMENT

Figure 5:
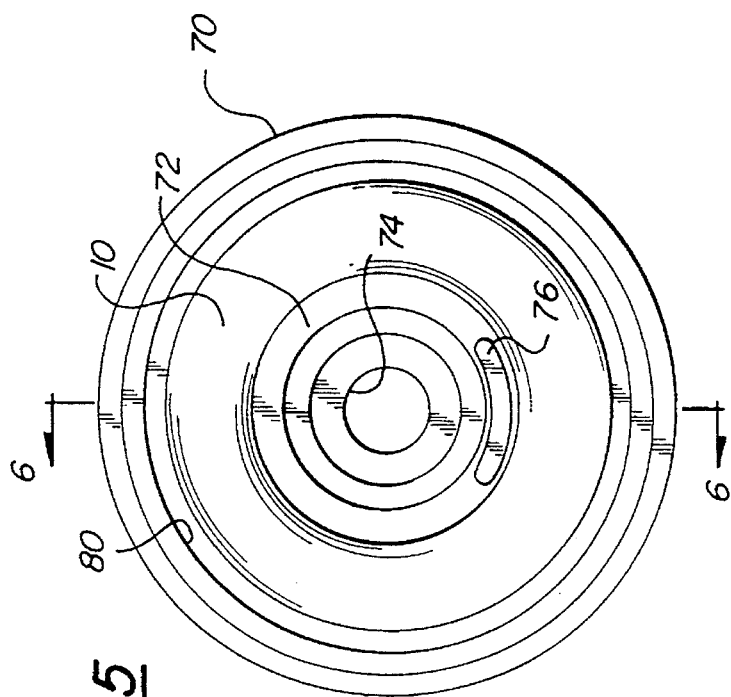
FIG. 5 is a top view of the pulse dampener disposed within the spacer.

A pulse dampener for a fuel system including a hollow torus-shaped body is generally shown at 10 in FIG. 1. The torus-shaped body defines a central aperture 11 therethrough and has a flexible shell, generally indicated at 12, made of a blow-moldable acetal copolymer which is resistant to fuels and solvents. The shell 12 encloses a space 14 for receiving a gaseous fluid.

The preferred acetal copolymer is manufactured by Hoechest Celanese Engineering Plastics division of the Celanese Corporation and is sold under the Celcon® Trademark. Celcon acetal copolymer is a blow-moldable resin plastic which can be pressurized and which satisfies stringent safety requirements. Celcon acetal copolymer has excellent resistance to the effects of a wide range of chemicals, oils, fuels and solvents at elevated temperatures.

The shell 12 is of substantially uniform thickness throughout, free of overlapping seams and uninterrupted by any openings through which gas can either be introduced into or escape from the space 14 so that the space 14 is hermetically sealed from ambient atmosphere by the shell 12. A charge of gaseous fluid is hermetically sealed within the space 14 to impart a predetermined internal pressure on the shell 12 and cause the shell 12 to deflect against the predetermined internal pressure of the gaseous fluid with predetermined deflection characteristics in response to external pressures. The exact pressure at which the pulse dampener 10 is charged is primarily dictated by the environment in which it is employed or the operating parameters of the pump in which it is used. Depending, therefore, on these operating parameters, a pulse dampener 10 of the subject invention may be pressurized within the range of 10 to 65 psi. It has also been found that the optimum pressure charge for a pulse dampener 10 as employed in the pump 20 shown in FIG. 3 is 55 psi.

The shell 12 of the hollow body pulse dampener 10 defines two flat surfaces 16 disposed in spaced parallel relation with respect to one another and perpendicular to the flow of fuel through the fuel system. The shell further includes a pair of sides 18 interconnecting the spaced flat surfaces 16 to define the torus-shaped body 10 of the pulse dampener to dampen pressure pulses within the fuel.

The pulse dampener 10 of the subject invention may be constructed in any geometric shape which is dictated by other design parameters in the fuel system such as the spacing and configuration dictated by a rotary fuel pump. To that end, and referring now to FIG. 3, a rotary fuel pump for pumping fuel along a fuel line is generally shown at 20.

The pump 20 includes a pump housing, generally indicated at 22, having a fuel inlet 24 and a fuel outlet 26. A pump means, generally indicated at 28 and an electric motor, generally indicated at 30, are rotatably supported within the housing 22 between the inlet 24 and the outlet 26.

The motor 30 includes an armature 32 mounted on a shaft 34 defining an axis through the housing 22 for driving the pump means 28 thereby pumping fuel along the fuel line. The pump housing 22 includes a centrally disposed cylindrical field casing 36 which is mounted on either end by inlet and outlet housing portions 38, 40, respectively, which correspond to the fuel inlet 24 and fuel outlet 26 of the fuel pump 20. Armature magnets 42, 44 are disposed within the field casing 36 and about the armature 32 as is commonly known in the art. A commutator 46 rotates with the armature 32 and is held in contact with brushes 48, 50 which are supported in the outlet housing 40. Electrical connectors 52, 54 provide current to the armature 32 through the brushes 48, 50 and the commutator 46 to drive the motor 30.

The outlet housing 40 further includes an insert 51 having a conically shaped passage 56 having exit port 58 which leads to the outlet 26 located in the terminal end of the outlet housing 40. A snub shaft 59 extends rearwardly from the armature 32 and commutator 46 and is journaled in the insert 51.

The inlet housing portion 38 includes a filter or screen 60 disposed in the inlet 24 and mounted to the exterior of a U-shaped hub 62. The shaft 34 is journaled in the hub 62. As alluded to above, the shaft 34 drives the pump means 28 which includes inner and outer gear rotors 64, 66. The inner gear rotor 64 is fixedly mounted to the shaft 34 and is positioned within the inner diameter of the outer gear rotor 66 to drive the outer gear rotor through meshed helical gears as is commonly known in the art. A port 68 provides fluid communication between the inlet 24 and the cylindrical field casing 36, past the rotors 64, 66 and the pulse dampener 10 as will be described in further detail below.

Figure 6:
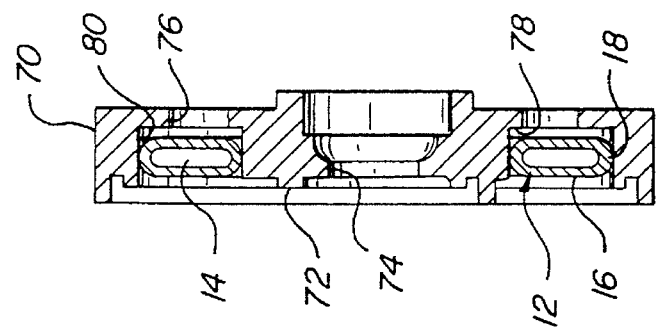
FIG. 6 is a cross-sectional side view of the spacer and pulse dampener shown in FIG. 5 taken substantially along lines 6—6.
Figure 4:
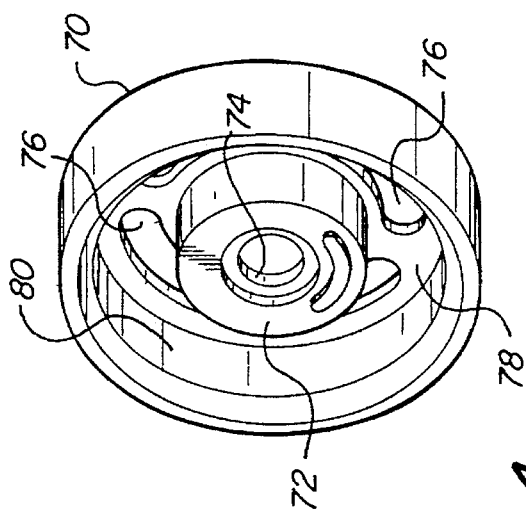
FIG. 4 is a perspective view of the spacer used to mount the pulse dampener within the pump.

As shown in FIGS. 3, 4, 5 and 6, the fuel pump also includes a substantially cylindrical spacer 70 which corresponds to the torus-shaped pulse dampener 10 and which is disposed about the shaft 34 between the rotors 64, 66 of the pump means 28 and the armature 32 of the electric motor 30. The pulse dampener 10 is supported by the spacer 70 within the housing 22. To that end, the spacer includes a centrally disposed boss 72 having a hole 74 which accommodates the shaft 34 and arcuate flow passages 76 through the spacer 70 disposed about the boss 72. The pulse dampener 10 is mounted within a cavity 78 formed between the cylindrical boss 72 and the side wall 80 of the cylindrical spacer 70 with the boss 72 adapted to be received through the central aperture 11 of the pulse dampener 10.

When the motor 30 is actuated to drive the pump means 28, fuel flows past the inlet 24 and filter 60 in the inlet housing 38 and through the port 68. The fuel is pumped by the rotor 64, 66 through the arcuate flow passages 76 in the spacer 70 and past the armature 32 in the cylindrical field casing 36. However, the fuel must first impinge upon at least one of the two flat surfaces 16 of the pulse dampener 10 which deflect against the predetermined pressure of the gaseous fluid disposed within the hermetically sealed space 14 to dampen pressure pulses in the fuel system. The fuel continues to flow past the commutator 46 and through the conically shaped passage 56 and exit port 58 of the insert 51 and out the outlet 26 of the outlet housing 40.

FIG. 7 discloses yet another operational environment for the pulse dampener. As shown in this figure, a pulse dampener 10 is disposed within a chamber 82 having an inlet 83 and an outlet 85 and which is located along a fuel line 84 and remote from the fuel pump. The chamber 82 may be of any geometric shape and may correspond to the shape of the pulse dampener 10. The pulse dampener 10 has a hollow torus-shaped body defining a flexible shell 12 made of a blow-moldable acetal copolymer which is resistant to fuels and solvents and which encloses a space 14 for receiving a gaseous fluid. The space 14 is of substantially uniform thickness throughout, free of overlapping seams and joints and uninterrupted by any openings though which gas can either be introduced into or escape from the space 14 so that the space 14 is hermetically sealed from the ambient atmosphere by the shell.

A charge of gaseous fluid is hermetically sealed in the space 14 to impart a predetermined internal pressure on the shell and cause the shell to deflect against the predetermined internal pressure of the gaseous fluid with predetermined deflection characteristics in response to external pressure in the fuel flowing through the chamber 82. In FIG. 7, the fuel flows through the line 84 into the chamber 82 and impinges upon the pulse dampener 10 which deflects against the predetermined internal pressures of the gaseous fluid disposed within the hollow pulse dampener 10 to dampen pressure pulses in the system.

A molding apparatus for making a hollow pressurized pulse dampener 10 is generally indicated at 90 in FIG. 8 and 9. The apparatus includes a two-mold assembly with each half oppositely disposed with respect to each other and symmetrical with respect to each other for forming a pulse dampener 10 as illustrated in FIG. 9. However, because the two-mold assemblies are identical with respect to one another, only one of the assemblies is illustrated in FIG. 8. The pulse dampeners of the subject invention are made using a blow-molding process in which blow-moldable resinous material, an acetal copolymer, is introduced between a pair of spaced, relatively movable mold members having complementary cavity portion. The mold members are moved to a closed position in which the cavity portions form a closed cavity communicating with the blow tube so that the moldable resinous material is expanded by the gaseous fluid from the blow tube into the cavity to form a flexible shell for the hollow body that corresponds to the shape of the cavity and encloses a space for receiving gaseous fluid from the blow tube.

The molding apparatus 90 includes a fixed platen 92 having a generally rectangular cross-section which, in turn, is mounted to a support block 94. The fixed platen 92 includes a primary member 96 which is generally circular in cross-section but which may be of any geometric shape. The primary member 96 extends forwardly of the fixed platen 92 and has a smaller cross-sectional area with respect to the fixed platen 92. The apparatus 90 further includes a secondary member 98 which also has a substantially rectangular cross-section with a cross-sectional area similar to that of fixed platen 92. The secondary member 98 includes a centrally disposed aperture 100 which closely conforms to the surface of the circular primary member 96 and a second mold surface 102 to define a mold cavity for molding a secondary mold.

The apparatus 90 includes a pair of fixed platens 92 and a pair secondary members 98, each oppositely disposed with respect to one another and adapted for mating sealed engagement to define a mold cavity and to form the pulse dampener 10. The primary member 96 is disposed through the centrally disposed aperture 100 of the secondary member 98 and includes a distal terminal end 104 which presents a first mold surface 106 for molding the pulse dampener 10. The terminal end 104 may be threadably and removably attached to the primary member 96 as best illustrated in FIG. 9. In this way, pulse dampeners having various geometric configurations and deflection characteristics may be manufactured by changing the terminal ends 104 of the primary member 96. In the illustrated embodiment, the first mold surface 106 is smooth.

The first mold surface 106 is disposed recessed within the second mold surface 102 of the secondary member 98. The secondary member 98 is moveable with respect to the primary member 96 to present the first mold surface 106 in the mold cavity to define the pulse dampener 10 from the secondary mold. Further, the secondary member 98 includes means 108 for continuously, positively and precisely pressurizing a mold cavity formed by the assembly and the secondary mold until the first mold surface 106 is presented within the cavity to mold the pulse dampener 10. More specifically, the means for continuously, positively and precisely pressurizing the mold cavity and the secondary mold includes a pair of grooves 108 oppositely disposed with respect to each other on the secondary members 98 for defining a passageway when the oppositely disposed mold assemblies are brought together in mating sealed engagement. The passageway provides fluid communication between the mold cavity and a pressurized fluid source for pressurizing the secondary mold and the pulse dampener to a precise, predetermined level.

The apparatus 90 also includes a biasing element, generally indicated at 112 to bias the secondary member 98 such that the first mold surface 106 is disposed recessed within the second mold surface 102. A pair of biasing elements 112 are disposed on either side of the primary member 96. Each biasing element 112 includes a plunger 114 which is disposed within a connecting passageway 116 which, itself, extends between the secondary member 98 and the fixed platen 92. The plunger 114 terminates in a bushing 118 which, in turn, is disposed in a cavity 120. The cavity 120 extends between the platen 92 and the support block 94. A coiled spring 122 is disposed within the cavity 120 and acts between the support blocks 94 and the bushing 118 through the plunger 114 to bias the secondary members 98 forward such that the first mold surface 106 is disposed recessed within the second mold 102. When the secondary member 98 is so biased, a gap 124 is presented between the secondary member 98 and the fixed platen 92. In this way, the secondary member 98 is allowed to move rearwardly back toward the fixed platen 92 against the biasing force of the biasing element 112, eliminating the gap 124 and at the same time presenting the first mold surface 106 into the cavity to mold the pulse dampener 10.

The method of making a pulse dampener of the subject invention includes the steps of expanding a mold material into a secondary shape, defining a primary shape from the secondary shape and by continuously, positively and precisely pressurizing the secondary shape with a predetermined pressure until the primary shape is defined from the secondary shape.

The step of expanding a mold material into a secondary shape includes the steps of, introducing the mold material between the mold cavities, moving a pair of oppositely disposed secondary members 98 into mating and sealed engagement to define a mold cavity, and expanding the mold material throughout the mold cavity. Further, the step of defining the primary shape from the secondary shape includes the steps of presenting a pair of first mold surfaces 106 into the cavity and into mating and sealed engagement to form the primary shape.

The apparatus 90 of the subject invention operates in the following manner. An acetal copolymer, Celcon®, is introduced between the two mold assemblies. The two symmetrical mold assemblies are moved toward each other such that the secondary members 98 come into mating and sealed engagement. The two secondary members 98 come together to form a mold cavity defined by the second mold surfaces 102 which in turn form the secondary mold. The acetal copolymer is then expanded or "blown" into the mold cavity using a predetermined pressure through the mating grooves 108 formed in the symmetrical second mold surfaces 102 and which form the molded passageway in the mold material. The acetal copolymer is allowed to begin to set.

During this time, the now forming secondary mold is being subjected to the predetermined pressure. At a predetermined time, increased force is placed on a fixed platen 92 which forces the moveable secondary member 98 to move rearwardly against the force of the biasing means 112 back toward the platen 92 closing the gap 124 and thus exposing the terminal ends 104 of the primary member 96 and bringing the first mold surfaces 106 which define the pulse dampener 10 together within the secondary mold formed by the second mold surfaces 102.

Said another way, the cavity is charged with the gaseous fluid from the blow tube at a precisely controlled pressure with the gaseous fluid permanently, hermetically sealed within the space at a predetermined pressure so that the flexible shell 12 of the hollow body pulse dampener will deflect against the internal pressure of the charge of the gaseous fluid with predetermined deflection characteristics in response to external pressure changes. The cavities come together to punch-out a hollow pulse dampener 10 within which is captured a positive, predetermined pressure. This important positive pressure feature is "captured" from the secondary mold by continuously pressurizing the secondary mold cavity throughout the process.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that within the scope of the appended claims the invention may be practiced otherwise than as specifically described.

What is claimed is:

1. A rotary fuel pump for pumping fuel along a fuel line, said pump comprising;

a pump housing having a fuel inlet and a fuel outlet, a pump means and an electric motor rotatably supported within said housing between said inlet and said outlet, said motor including a shaft for driving said pump means thereby pumping said fuel along the fuel line;

said fuel pump including a pulse dampener disposed about said shaft and between said pump means and said electric motor and along the path of fuel flowing through said housing, said pulse dampener including a hollow torus-shaped body with a fluid disposed within said body, said hollow body defining two flat surfaces disposed in spaced parallel relation with respect to one another and perpendicular to the flow of fuel through said pump and a pair of sides disposed perpendicular to and interconnecting said spaced flat surfaces to define said torus-shaped pulse dampener to dampen pressure pulses with said fuel.

2. A pump as set forth in claim 1 further characterized by said torus-shaped pulse dampener defining a central aperture therethrough, said pump including a substantially cylindrical spacer which corresponds to the torus-shaped pulse dampener disposed between said pump means and said electric motor, said pulse dampener supported by said spacer within said housing, said spacer including a centrally disposed boss and flow passages through said spacer and disposed about said boss, said shaft extending through said boss and said boss adapted to be received through said central aperture of said pulse dampener.

3. A pulse dampener for fuel systems having a rotary fuel pump and a fuel flow passage, said pulse dampener comprising;

a hollow torus-shaped body with a fluid disposed within said body, said hollow body defining two flat surfaces disposed in spaced parallel relation with respect to one another and perpendicular to the flow of fuel through said fuel system and a pair of sides disposed perpendicular to and interconnecting said spaced flat surfaces to define said torus-shaped pulse dampener to dampen pressure pulses within said fuel.

4. A pulse dampener for fuel systems, said pulse dampener comprising;

a hollow body made by a blow molding process in which blow moldable resinous material is introduced between a pair of spaced, relatively moveable mold members having complementary cavity portions, the mold members being moved to a closed position in which the cavity portions form a closed cavity communicating with a blow tube so that the moldable resinous material is expanded by a gaseous fluid flowing from the blow tube into the cavity to form a flexible shell for the hollow body that corresponds to the shape of the cavity and encloses a space for receiving gaseous fluid from the blow tube;

charging said enclosed cavity with gaseous fluid from the blow tube at a precisely controlled predetermined pressure and then permanently hermetically sealing a charge of gaseous fluid within said space at said predetermined pressure so that the flexible shell of the hollow body will deflect against the internal pressure of said charge of gaseous fluid with predetermined deflection characteristics in response to external pressure changes;

said shell being made of a blow moldable acetal copolymer which is resistant to fuels and solvents and formed with a substantially uniform thickness throughout and being uninterrupted by any openings through which gas can either be introduced into or escape from said space so that said space is permanently and hermetically sealed from ambient atmosphere.

* * * * *